United States Patent
Burd

(10) Patent No.: US 9,322,192 B2
(45) Date of Patent: Apr. 26, 2016

(54) AIRCRAFT GALLEY LATCHES AND SEALING SYSTEM

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 359 days.

(21) Appl. No.: 13/851,399

(22) Filed: Mar. 27, 2013

(65) Prior Publication Data

US 2013/0257067 A1   Oct. 3, 2013

Related U.S. Application Data

(60) Provisional application No. 61/617,567, filed on Mar. 29, 2012.

(51) Int. Cl.
*E05C 1/06* (2006.01)
*E05C 3/04* (2006.01)
(Continued)

(52) U.S. Cl.
CPC .......... *E05B 13/004* (2013.01); *B64D 11/0007* (2013.01); *E05C 1/06* (2013.01);
(Continued)

(58) Field of Classification Search
CPC ..... E05B 13/002; E05B 13/004; E05B 13/10; E05C 1/004; E05C 1/006; E05C 1/02; E05C 1/06; E05C 1/065; E05C 1/08; E05C 1/12; E05C 1/14; E05C 1/145; E05C 3/006; E05C 3/02; E05C 3/04; E05C 3/044; E05C 3/047; E05C 3/048

USPC ........... 292/200, 202, 210, DIG. 30, 3–7, 32, 292/34, 37, 40, 57, 58, 63, 64, 66, 165, 173, 292/179, 140, 143, 256, 257, 219, 226, 228, 292/256.5, 336.3, DIG. 11, DIG. 15, DIG. 37
See application file for complete search history.

(56) References Cited

U.S. PATENT DOCUMENTS 220,891 A * 10/1879 Wayne, Jr. .................... 292/210
301,804 A *  7/1884 Chevremont ................. 292/207
(Continued)

FOREIGN PATENT DOCUMENTS

DE     9401958 U1 *  8/1994
DE    29702266 U1 *  5/1997
(Continued)

OTHER PUBLICATIONS

EPO, International Search Report and Written Opinion in counterpart International Patent Application No. PCT/US2013/034434.

*Primary Examiner* — Alyson M Merlino
(74) *Attorney, Agent, or Firm* — Fulwider Patton LLP

(57) ABSTRACT

A rotary latch assembly for a galley cart compartment door is disclosed comprising a barrel member rotating on a spindle and a handle connected to the barrel member. An interfering block outside the barrel member can prevent rotation of the barrel member when engaged with the barrel member, and be displaced by a lock button diametrically opposed with the interfering block. The handle of the rotary latch bears against the door in a locked position to prevent the door from opening, and the button when depressed releases the barrel member to rotate and the handle to pivot out of the path of the door.

4 Claims, 3 Drawing Sheets

(51) Int. Cl.
*E05B 13/00* (2006.01)
*E05C 3/02* (2006.01)
*B64D 11/00* (2006.01)

(52) U.S. Cl.
CPC .. *E05C 3/02* (2013.01); *E05C 3/04* (2013.01); *E05C 3/044* (2013.01); *E05C 3/047* (2013.01); *E05C 3/048* (2013.01); *Y02T 50/46* (2013.01); *Y10T 292/108* (2015.04)

(56) References Cited

U.S. PATENT DOCUMENTS

| | | | | |
|---|---|---|---|---|
| 480,688 | A | * | 8/1892 | Bennett .......... 292/207 |
| 589,264 | A | * | 8/1897 | Minott .......... 292/140 |
| 694,612 | A | * | 3/1902 | Carrick .......... 292/67 |
| 777,408 | A | * | 12/1904 | Fletcher .......... 292/182 |
| 979,581 | A | * | 12/1910 | Smith .......... 292/210 |
| 4,216,985 | A | * | 8/1980 | Sorensen .......... 292/336.3 |
| 4,438,964 | A | | 3/1984 | Peters |
| 4,911,487 | A | | 3/1990 | Rachocki |
| 5,234,238 | A | | 8/1993 | Takimoto |
| 5,605,344 | A | | 2/1997 | Insalco et al. |
| 5,630,630 | A | | 5/1997 | Price et al. |
| 5,927,772 | A | | 7/1999 | Antonucci et al. |
| 6,152,501 | A | | 11/2000 | Magi et al. |
| 7,065,992 | B2 | | 6/2006 | Talukdar et al. |
| 7,458,441 | B2 | | 12/2008 | Hu |
| 7,544,915 | B2 | | 6/2009 | Hu |
| 8,347,667 | B2 | | 1/2013 | Bacon |
| 8,393,187 | B2 | | 3/2013 | Bacon |
| 2006/0038414 | A1 | * | 2/2006 | Jien .......... 292/241 |
| 2010/0117379 | A1 | | 5/2010 | Mitchell et al. |
| 2014/0152027 | A1 | * | 6/2014 | Burd .......... 292/200 |

FOREIGN PATENT DOCUMENTS

| | | | | | |
|---|---|---|---|---|---|
| EP | 460297 | A1 | * | 12/1991 | |
| EP | 2096243 | A1 | * | 9/2009 | .......... E05C 1/06 |
| GB | 2180586 | A | * | 4/1987 | .......... E05C 1/06 |
| GB | 2188671 | A | * | 10/1987 | |
| GB | 2302128 | A | | 1/1997 | |
| GB | 2305960 | A | | 4/1997 | |
| GB | 2306553 | A | | 5/1997 | |
| GB | 2375563 | A | * | 11/2002 | |
| WO | 0146543 | A2 | | 6/2001 | |

* cited by examiner

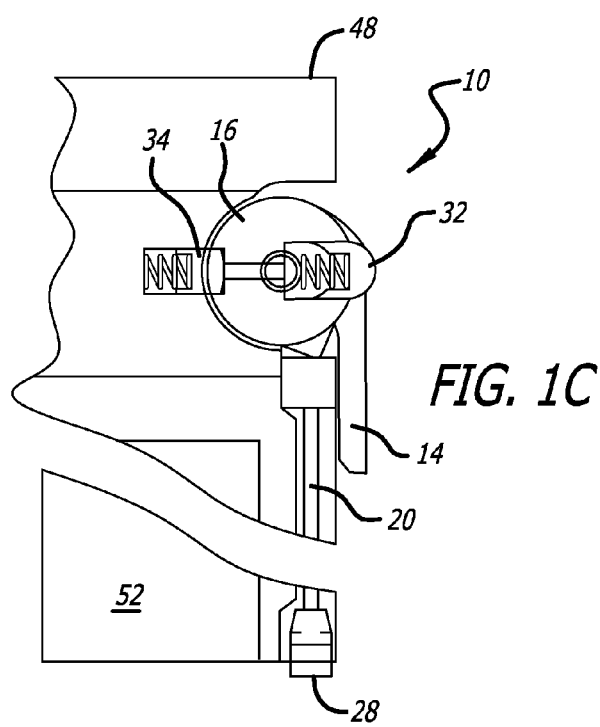
*FIG. 1C*
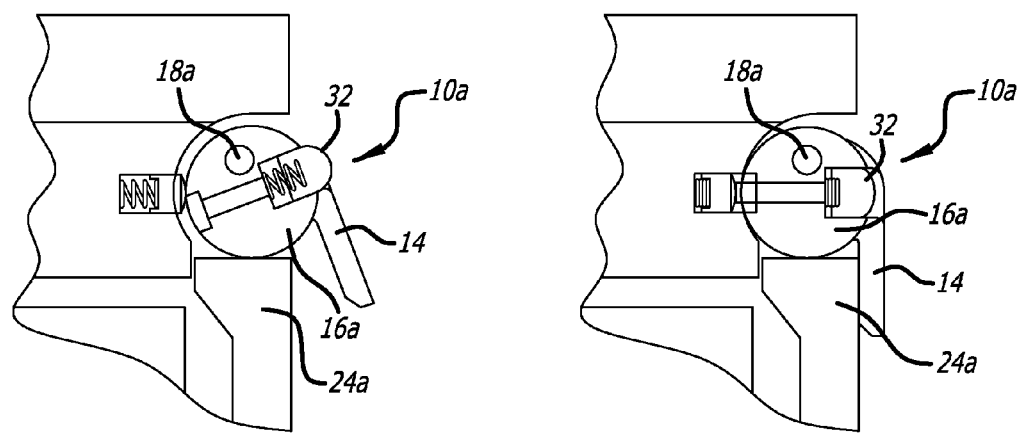
*FIG. 2A*  *FIG. 2B*

AIRCRAFT GALLEY LATCHES AND SEALING SYSTEM

CROSS-REFERENCES TO RELATED APPLICATIONS

This application claims priority from U.S. Application No. 61/617,567, filed Mar. 29, 2012, incorporated by reference in its entirety.

BACKGROUND

Beverage service on an aircraft is usually accomplished by attendants who wheel beverage carts down the aisles of the plane, providing drinks to those passengers that request them. The challenge with most beverage carts used in today's aircraft is that these units are quite heavy and mobile, and in the event of turbulence or other aircraft movement these units can shift or even begin moving if not properly constrained, leading to a danger risk. Also, storing these carts when not in use requires that they be securely stationed, but easily and quickly released when needed. Accordingly, these carts are provided with immobilization systems that attempt to keep the beverage carts stationary when not in use but is easily disengaged when the cart needs to be released for serving the passengers.

In order to retain a catering cart within a commercial aircraft during normal service and in emergency conditions, carts are normally equipped with retraining devices commonly known as "turn buttons" that are deployed to secure the carts in place. The turn buttons are levers or handles that are rotated downward, causing the cart to engage with a lower surface of a work deck beam. However, turn buttons have inherent drawbacks in their design.

One disadvantage concerns the current trend towards the "air over" method of cart chilling that requires the cart bays to have doors. This means that the turn buttons have to be placed either on the outside of the doors or inside the doors. If placed outside the doors, there is a resultant increase in the depth of the galley when the carts are stored in the galley, and the turn buttons are visible to the observer, leading to a poor aesthetic appearance of the cart. There are also issues with ergonomics in having the turn button outside the doors. Alternatively, the turn buttons can be located on the inside of the bay doors, but this also leads to a resultant increase in the depth of a galley, and an increase in the work deck height. There are also potential cold bridge issues through the doors themselves, i.e., thermal losses resulting from conduction via the turn buttons. In this case, the doors are not normally used for retention (with the possible exception of cart kick-up loads), although additional door latching is required to secure the doors themselves.

To release the carts, both turn buttons need to be stowed which requires the use of both hands or a repeated single action, and there is no simultaneous "close-lock" operation available with this design in an emergency.

While engaged with the work deck beam, the turn buttons must withstand the twisting force imposed on their rear face by forward momentum of fully loaded carts under simulated emergency conditions. The beam is usually manufactured from aluminum, is quite heavy, and can form yet another potential cold bridge within the chilled cart compartment. The present invention is designed to overcome these disadvantages.

In addition, current turn buttons only perform their primary function of retention, and do not contribute to the galley door sealing capabilities. It would be beneficial to provide adequate chilled air leak sealing in order to meet the requirements of refrigerated galley testing and to prevent condensation. Unfortunately, the door seal is not allowed to "sweep" the floor which causes rapid wear.

SUMMARY OF THE INVENTION

The present invention is a low profile rotary latch that can be used to restrain a cart bay door, which in turn retains the carts and their contents. The latch of the present invention consists of a barrel (a), that rotates on a central spindle (b), with paddles (c) that are used to restrain the doors of the cart. The latch of the present invention features a manual release and automatic deadlock operation on closure. In a preferred embodiment, the latch also engages a sealing mechanism that, when the carts are stored and the latch is deployed, creates an air seal to keep cold air from escaping the chilled cart compartment.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1c is a cross sectional view of the embodiment of FIG. 1a with a seal engaged;

FIG. 2a is a cross sectional view of a second preferred embodiment of a rotary latch;

FIG. 2b is a cross sectional view of the latch of FIG. 2a in the locked position;

DETAILED DESCRIPTION OF THE PREFERRED EMBODIMENTS

Figure 1A:
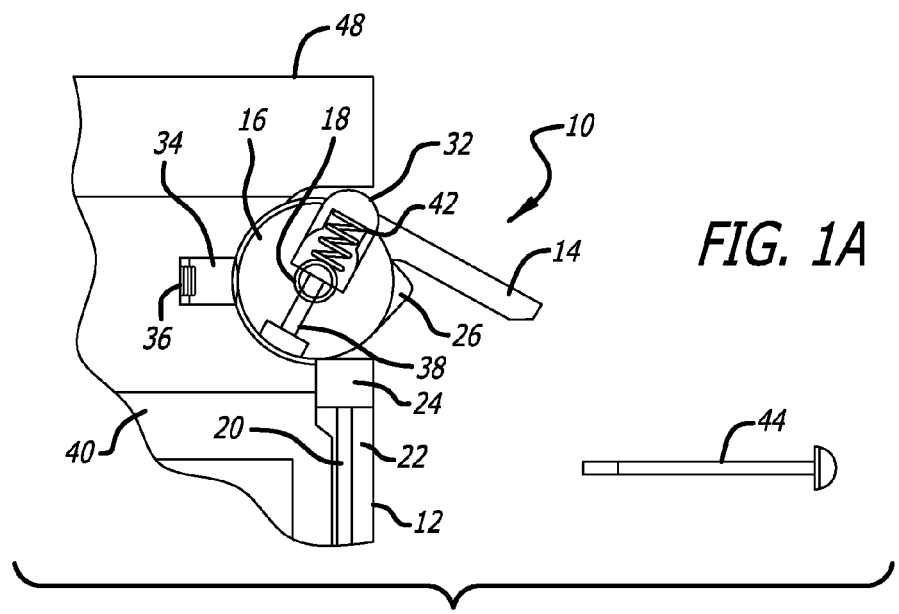
FIG. 1a is a cross sectional view of a first preferred embodiment of a rotary latch for a service cart bay door.

The present invention is a rotary latch system for a beverage cart bay that can also serve to restrain the cart door, which in turn retains the cart and their contents. A rotary latch 10 with a paddle handle 14 is mounted below a work deck 48 and above a beverage cart bay door 12 as shown in FIG. 1. The latch 10 comprises a barrel 16 that rotates on a spindle 18 between a deployed (latched) position (FIG. 1c) and an unlatched position (FIG. 1a). The latch 10 is manually operated via the attached handle 14 to rotate up and away from the door 12 in the unlatched position as shown in FIG. 1a to allow the door 12 to swing open. The rotary latch 10 includes a spring loaded release button 32 that locks the rotary latch 10 in place. If the release button 32 is not depressed and the latch is in the locked position (FIG. 1c), the barrel 16 cannot rotate to open the latch because an interfering latch block 34 outside the barrel 16, but spring loaded to be biased toward the barrel 16, engages the barrel 16 to prevent rotation. However, if the spring loaded release button 32, which is diametrically opposed to the interfering latch block 34, is depressed, the latch block 34 is driven into its housing against the bias of a spring 36 such that the barrel 16 can now rotate and the handle 14 of the rotary latch 10 can be raised upward to open the latch.

Figure 1B:
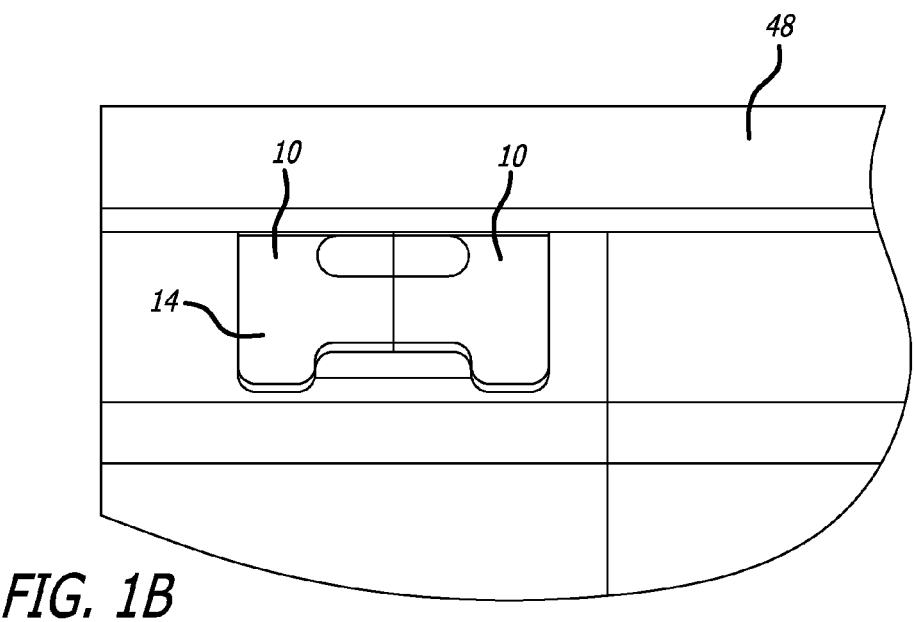
FIG. 1b is a front view of the service cart bay and latch handle.

As shown in FIG. 1b, when the handle 14 bears against the door due to the latch being in the locked position, the cart bay doors are prevented from opening. However, an attendant can quickly open the latch with one hand by depressing the release button and lifting the handle 14, clearing the way for the cart bay door 12 to pass beneath the handle 14 and open to access the cart 52.

With the latch 10 in the locked position of FIG. 1c, a sealing mechanism may be actuated via a push rod 20. The push rod 20 reciprocates vertically within a channel 22 along the front of the cart door 12. The push rod 20 is connected to a block 24 that is in contact with the barrel 16 of the latch 10. The barrel 16 includes a lobe 26 adjacent the handle 14, such that the lobe 26 comes in contact with and displaced the block 24 vertically downward when the latch in the locked position as shown in FIG. 1c. When the block 24 is displaced downward by the lobe 26, the connected push rod 20 is also driven downward. The opposite end of the push rod 20 is a seal 28 above a bottom edge of the card door 12. When the push rod 20 is driven downward by the block 24, the seal 28 engages the floor and acts as a seal to prevent cool air from escaping under the door, and further can act as a brake for the cart 52, lifting the wheels of the cart off the ground.

In operation, the spring loaded release button 32 of the latch 10 is depressed, pushing the latch block 34 out of the barrel 16 and into its housing via the push rod 38. With the latch block 34 cleared, the barrel 16 and the paddle handle 14 may now rotate upwards as shown in FIG. 1 as the body of the barrel 16 keeps the latch block 34 disengaged in the unlatched mode. In the unlatched mode, the door 12 may be opened and the cart 40 removed. In alternate embodiments, the door 12 may be spring loaded to assist in this operation or the flip up action of the latch 10 can be used to move the door outward, eliminating the need for a separate handle. A benefit of the present invention is that the design allows both latches to be opened simultaneously with one hand. To secure the door, both primary and secondary handles 14 can be depressed simultaneously until the latch block 34 via its associated spring 36 automatically projects back into its retaining slot in the barrel 16.

In the event of an emergency, the latches can be engaged without the door being closed, although full retention would be compromised as the meal cart door itself would not be secured.

In the case of a failure of either the release button 32 or latch block spring 42, an elongate service tool 44 can be inserted into the covered access hole in the release button 32, and either the latch block 34 depressed and the latch released or the latch block 34 drawn forward (the tool 44 is engaged via threads into the latch block 34 at an opening on the front face) and the latch block 34 pulled forward into the barrel 16 to secure the latch 10. Alternative safety lock methods may also be employed such as a secondary locking pin.

The latch 10 can be positioned centrally on the door 12 or offset to the side opposite a hinge. When the latch 10 is mounted with the work deck structure 48, the latch body foot print is relatively small and does not require a substantial work deck beam for support, instead relying on its integration with the galley composites.

The closing of the latch by rotating the handle 14 downward (clockwise in FIG. 1a) engages the self-retracting floor and side seals 28 at the base and on the sides of the door 12 when the latch 10 is placed in secure mode. The seals 28 are deployable, for example, in the vertical direction as shown. The seal mechanism 28 is deployed (i.e., pushed down against the floor) when the latch is operated by the lobe 26 on the barrel 16 that acts as a cam to push the block 24 downward, which in turn deploys the seal 28 via the push rod 20.

In FIG. 2, the latch 10a is shown with an alternative arrangement whereby the barrel 16a is eccentrically mounted to the spindle 18a such that the rotation of the barrel 16a moves it upward and outward after the release button 32 is depressed. This alternate embodiment can also deploy a door bottom mounted floor seal 28, where the cam action of the eccentrically mounted barrel 16a depresses a seal block 24a to in turn drive the push rod 20 as set forth above to push the seal 28 down against the floor. As the door 12 is pushed downward and inward by the eccentric action of the barrel 16a in relation to the pivot point, the seal 28 at the bottom of the door 12 would be fixed. The displacement distance of the eccentric latch 10a can be varied by varying the position of the pivot point of the shaft 18a, around which the barrel 16a rotates.

Figure 3A:
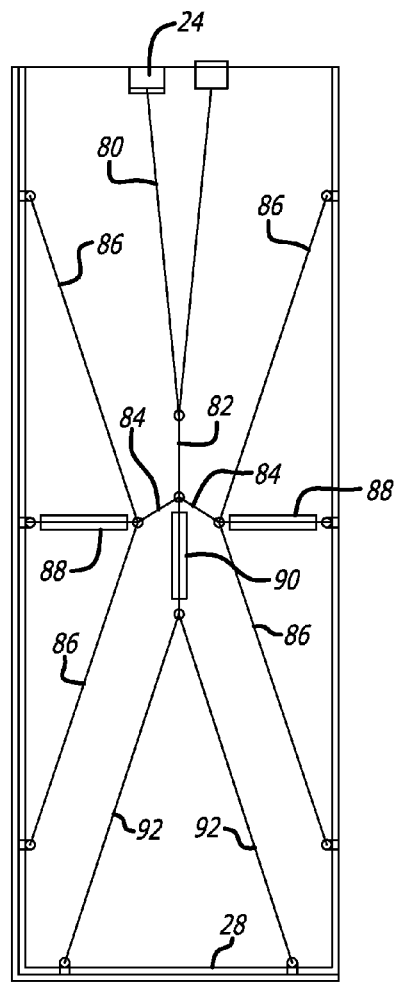
FIG. 3a is a sealing linkage that cooperates with the rotating latch to seal the cart bay.
Figure 3B:
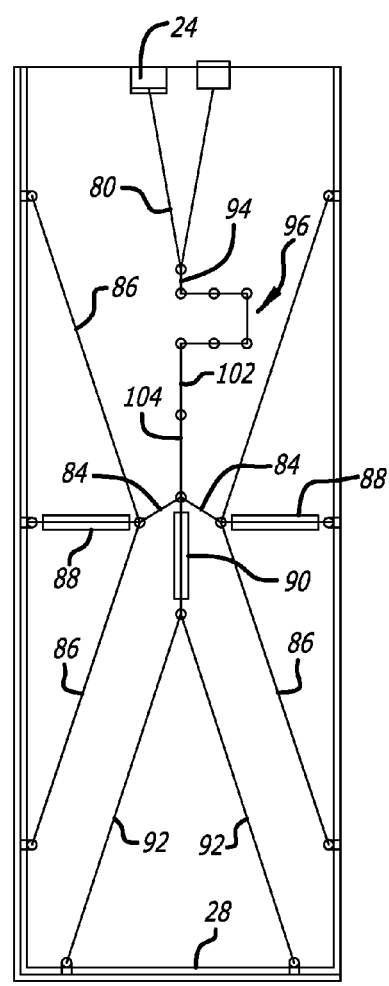
FIG. 3b is a second sealing linkage that cooperates with the rotating latch to seal the cart bay.

FIG. 3 illustrates another method of deploying retractable door side and bottom seals by using a linkages such as a rod, Y pivot, and lever arrangement. When the seal block 24 is depressed via the latching of the door 12, the articulating rod 80 is pushed downward. The movement of the articulating rod 80 moves a vertical sliding rod 82 attached to the articulated levers 84, which push the articulated side seal actuation rods 86 via a horizontal slider 88. The vertical sliding rod 82 also deploys the door bottom seal 28 via the vertical slider 90 and articulated bottom seal actuation rods 92. A duplex lever arrangement in FIG. 3b can be used to amplify the movement of the seal blocks 24 by, for example, a ratio of 5:3. This increases the distance that both side and bottom seals are deployed (for the same vertical movement of the seal block 24) for greater pressure and more effective sealing.

In operation, the duplex lever arrangement of FIG. 3b works as follows: the latching of the door 12 depresses the seal block 24, which pushes the articulated rod 80 downward moving the short vertical sliding rod 94 connected to the duplex levers 96. The amplified movement is transferred along sliding rod 102 to articulated the levers 104, which push the articulated side seal actuation rods 84 via a horizontal slider. The long vertical sliding rod 104 is also used to deploy the door bottom seal 28 via the vertical slider 90 and articulated bottom seal actuation rods 92. In this manner, both horizontal and vertical seals are deployed with a simple downward movement of the seal block 24.

Benefits of the present invention include the feature whereby the latch allows one handed operation of both primary and secondary latches simultaneously. The latch can also feature a secure automatic deadlock action when engaged to make engagement easier for busy flight attendants. Since the latch is designed to be mounted without a work deck beam, weight is saved and the cold bridge effect is reduced or eliminated. In addition, the latches can be deployed without the need to close the cart bay door in an emergency situation. The design of the latch of the present invention allows for a floor seal to be deployed from the bottom of the cart bay door, either by displacing the door downwards or through direct activation of a retractable seal within the door. The latch can also be used to deploy cart bay door seals from the sides of the cart bay door through the action of latching the door. Moreover, the design of the latch permits a faulty latch module to be exchanged as an LRU part (line replaceable unit) without special tools.

While the foregoing description is intended to be illustrative, it should not be read as limiting the invention to any particular embodiment or embodiments depicted in the figures or described herein. Rather, one of ordinary skill in the art would understand and appreciate that various modifications are available and the present invention is intended to include all such modifications as would be understood and appreciated by the person of ordinary skill in the art.

I claim:

1. A rotary latch assembly for a galley cart compartment door, comprising:
    a barrel member rotating eccentrically on a spindle;
    a handle connected to the barrel member;
    an interfering block located outside the barrel member and biased toward the barrel member, where the interfering block can prevent rotation of the barrel member when engaged with the barrel member;
    a release button diametrically opposed with the interfering block, the release button connected to a rod that disengages the interfering block from the barrel member when the release button is depressed;
    wherein the handle bears against the door when the barrel member is in a locked position to prevent the door from opening, and wherein the button, when depressed, releases the barrel member to rotate and the handle to pivot out of the path of the door, allowing the door to open.

2. The rotary latch assembly of claim 1, wherein the movement of the barrel member on the eccentrically mounted spindle engages a sealing actuator when the the barrel member is in a locked position to form a seal with a floor.

3. The rotary latch assembly of claim 1, wherein the interfering block engages the barrel member when the barrel member is rotated to the locked position.

4. The rotary latch assembly of claim 1, further comprising a seal block that is actuated when the barrel member is in the locked position, the seal block causing a seal to be depressed against a floor when the seal block is actuated.

* * * * *